United States Patent [19]
Brzozowski et al.

[11] 3,760,071
[45] Sept. 18, 1973

[54] PROCESS FOR TREATING BY-PRODUCT TITANIUM TETRACHLORIDE FROM PYROGENIC TIO₂ PRODUCTION

[75] Inventors: Stanley F. Brzozowski; Alonzo Farmer; William C. Pefferman, all of New Martinsville, W. Va.

[73] Assignee: PPG Industries, Inc., Pittsburgh, Pa.

[22] Filed: Jan. 8, 1971

[21] Appl. No.: 195,033

[52] U.S. Cl. .................. 423/613, 423/76, 423/77, 423/492
[51] Int. Cl. ................. C01g 23/04, C01g 23/02
[58] Field of Search ............... 23/87 TP, 87, 202 V; 423/613, 610, 492, 76, 77

[56] References Cited
UNITED STATES PATENTS

| | | |
|---|---|---|
| 2,289,327 | 7/1942 | Pechukas ........................ 23/87 TP |
| 2,396,458 | 3/1946 | Cole et al. ...................... 23/87 TP |
| 2,416,191 | 2/1947 | Meister ......................... 23/87 TP X |
| 2,463,396 | 3/1949 | Krchma ........................ 23/87 TP UX |
| 2,543,591 | 2/1951 | Nowicke ....................... 23/87 TP UX |
| 2,754,255 | 7/1956 | Stambaugh ................... 23/87 TP UX |
| 3,156,630 | 11/1964 | Fahnoe ........................ 23/87 TP X |
| 3,224,836 | 12/1965 | Allen et al. .................... 23/202 V |
| 3,526,477 | 9/1970 | Shen Wu Wan ............... 23/202 V |

Primary Examiner—Edward Stern
Attorney—Chisholm & Spencer

[57] ABSTRACT

By-product titanium tetrachloride recovered from production of pyrogenic titanium dioxide is degassed to remove dissolved free chlorine and subsequently distilled to remove objectionable concentrations of silicon and/or tin present as chlorides therein.

11 Claims, 3 Drawing Figures

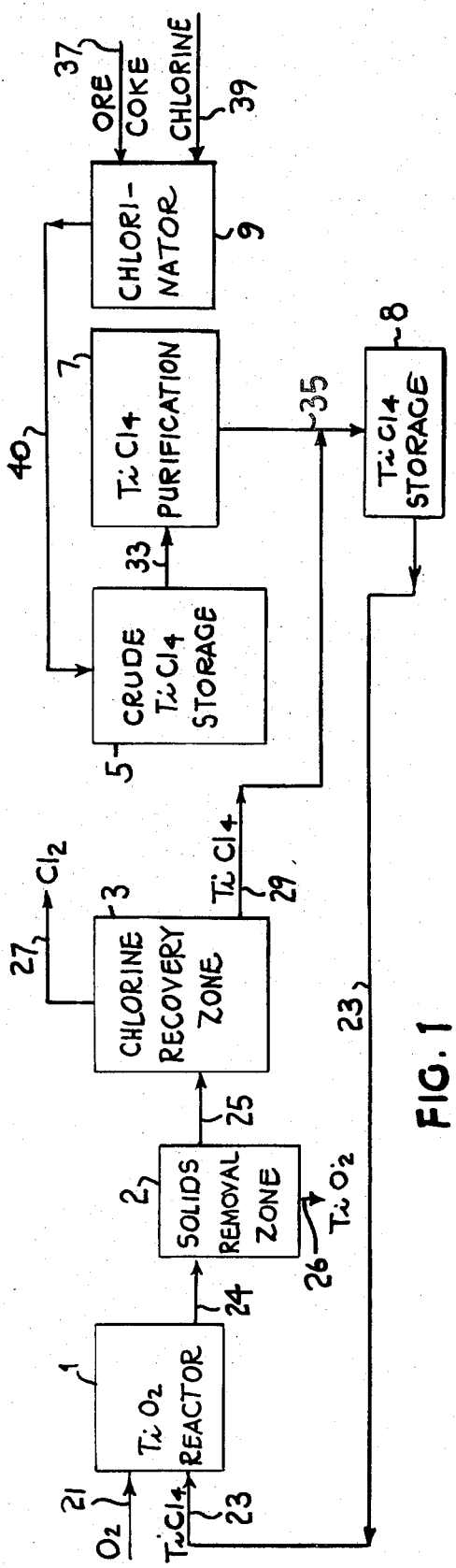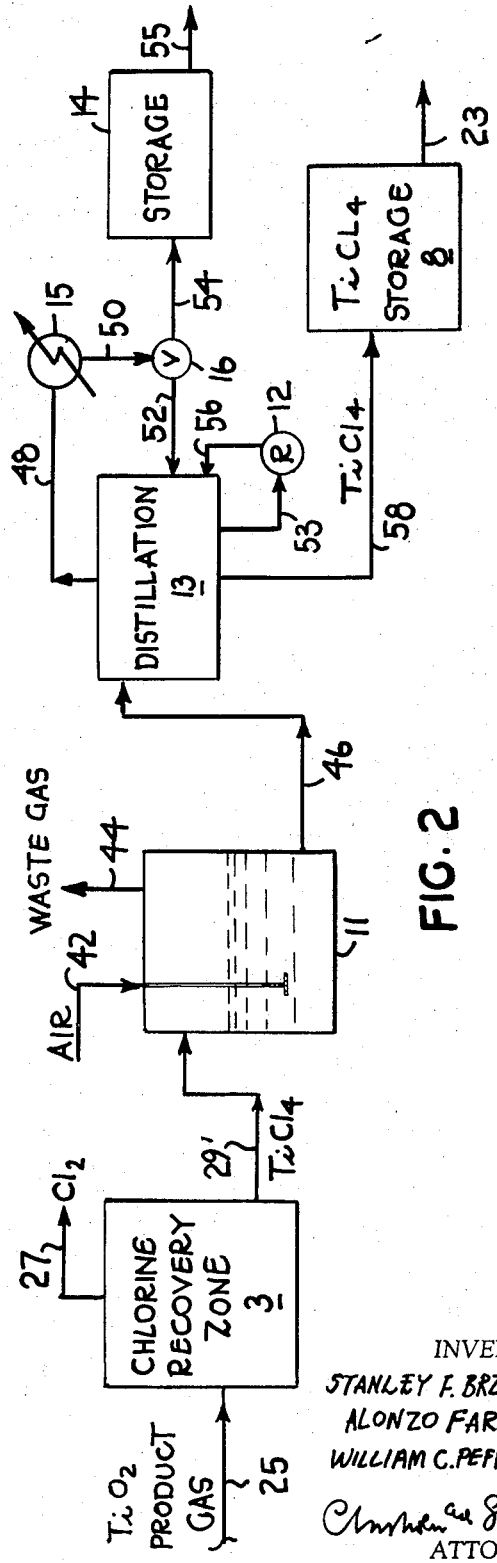

PROCESS FOR TREATING BY-PRODUCT TITANIUM TETRACHLORIDE FROM PYROGENIC TiO$_2$ PRODUCTION

DESCRIPTION OF THE INVENTION

Pigmentary titanium dioxide, which is the chief white pigment used in the paint industry, is produced commercially by two principal manufacturing processes. One of these processes, i.e., the chloride process, produces pigmentary titanium dioxide by reacting titanium tetrachloride in the vapor phase with oxygen. Such pigment is referred to as "pyrogenic" titanium dioxide. Because of the thermodynamics of the aforesaid reaction, a small amount, e.g., from about 0.5 to about 6 percent, more usually from about 0.5 to about 1.5 percent, of the titanium tetrachloride fed to the oxidation reactor is not oxidized to titanium dioxide, i.e., remains unreacted, despite the use of a stoichiometric excess of oxygen. The exact amount of unreacted TiCl$_4$ produced depends to a great extent on the particular manner in which the oxidation process is conducted. Unreacted titanium tetrachloride is removed from the reactor with the product effluent, i.e., a suspension of solid, finely-divided titanium dioxide in the product effluent gases, of which chlorine represent a principal constituent. The gaseous portion of the product effluent is separated subsequently from the solid pigment product suspended therein; and, thereafter, the unreacted titanium tetrachloride and chlorine by-products are separated from each other. The titanium tetrachloride recovered is stored for subsequent use, e.g., recycling back to the reactor.

Because industry requires pigmentary titanium dioxide of high purity, the titanium tetrachloride oxidized to produce the pigment must also be comparatively pure. Typically, titanium tetrachloride is produced by the chlorination of a titanium-bearing material, such as ilmenite, rutile or a titanium slag, in the presence of a carbonaceous reductant, e.g., coke, in a static or fluo-solids bed type chlorinator. The vaporous titanium tetrachloride removed from the chlorinator is condensed to form an impure titanium tetrachloride condensate. Since there are a number of metallic and non-metallic elements in the titanium-bearing material, in addition to titanium, which react with chlorine to form volatile chlorides and which are carried over as product with the titanium tetrachloride vapors, the titanium tetrachloride condensate is impure. Some of the aforementioned volatile chlorides other than titanium tetrachloride found in the crude condensate include, for example, the chlorides of silicon, aluminum, niobium, tungsten, iron, manganese, magnesium, calcium, zirconium, vanadium, tin and chromium.

Purification of the impure titanium tetrachloride typically involves: separation of the solids contained in the impure titanium tetrachloride condensate, e.g., solid metal chlorides, such as iron chlorides, coke and the titanium-bearing material, by settling, vaporization or other conventional techniques; chemical purification to remove vanadium impurity; and distillation to produce a substantially vanadium-free, typically water-white titanium tetrachloride product.

As is known to those skilled in the art, the production of pigmentary titanium dioxide by vapor phase oxidation of titanium tetrachloride is conducted under precise reaction conditions with relatively pure reactants. Variations in the purity of the principal reactants, e.g., titanium tetrachloride and oxygen, can produce commercially unacceptable pigment. In addition to the principal reactants, titanium tetrachloride and oxygen, the production of pyrogenic titanium dioxide can be conducted in the presence of precise and critical amounts of rutilizing agents, such as aluminum or zirconium, alkali metals, e.g., potassium, and other metals, such as silicon. The aforesaid metal additives are most conveniently provided by their respective chlorides because the oxidation product thereof produces by-product chlorine which is already present in the system as an oxidation product of titanium tetrachloride. The presence of metal additives in the oxidation reactor other than those precisely added can upset the predetermined reaction conditions and result in the production of commercially unacceptable pigment.

In the production of the titanium dioxide in accordance with the methods described in U.S. Pat. No. 3,214,284, both aluminum chloride and silicon tetrachloride are introduced into the oxidation reactor simultaneously with the titanium tetrachloride. These metal chloride additives are introduced in amounts sufficient to provide from about 0.1 to about 10, preferably from 1 to 2.5, weight percent co-oxidized alumina and from about 0.05 to about 5, preferably from 0.1 to 1, weight percent co-oxidized silica. It has now been observed that while substantially all of the aluminum, as aluminum chloride, introduced into the oxidation reactor is oxidized, a small amount of the silicon, as silicon tetrachloride, remains unreacted and is carried along with the unreacted titanimum tetrachloride and recovered therewith. Although the amount of silicon tetrachloride that remains unreacted is small, over a period of time the amount of unreacted silicon tetrachloride builds up to a point where it represents a significant concentration, i.e., greater than 0.05 weight percent, in the by-product titanium tetrachloride. Thus, the nature of the chloride process causes a concentrating of unreacted SiCl$_4$ in the by-product TiCl$_4$ to a point where it amounts to a significant quantity relative to the amount of SiCl$_4$ used in the process. Thus, for example, if 1 weight percent of silicon tetrachloride is introduced into the oxidation reactor and the TiCl$_4$ already contains a significant quantity of SiCl$_4$, e.g., 0.5 weight percent, the pigment product recovered would be different from that obtained using only 1 percent silicon.

The potential difficulties presented by the presence of unreacted SiCl$_4$ in the by-product TiCl$_4$ can be accommodated by analyzing the by-product TiCl$_4$ and adding to the reactor only that amount of silicon necessary to bring the total silicon level in the reactor to the level required. Further, if silicon is not used in the production of pyrogenic TiO$_2$, a buildup of silicon values in the by-product TiCl$_4$ does not appear to occur because the small amount of silicon present in the TiCl$_4$ reactant is at least partially oxidized in the oxidation reactor.

However, it has been observed also that tin chloride is accumulated and concentrated in the titanium tetrachloride by-product. While the source of the tin is not known for certain, it is presumed that it is derived from the titaniferous ore from which the titanium tetrachloride is produced and is, therefore, present in small quantities in the TiCl$_4$ reactant. Unlike silicon, tin chloride is not oxidized in the oxidation reactor and, therefore, continues to recycle through the $TiO_2$ process and build up in the by-product $TiCl_4$.

Both silicon and tin are present in titanium-bearing materials. In titaniferous ores, such as rutile or ilmenite, the amount of silicon, as oxide ($SiO_2$), can vary, depending on the source from about 0.1 to about 5 weight percent. Normally, the $SiCl_4$ produced during chlorination of the titaniferous ore is substantially removed from the $TiCl_4$ during purification of the $TiCl_4$ so that the amount of silicon (as Si) in purified $TiCl_4$ is typically less than about 0.005 percent (50 ppm). Similarly, the concentration of tin, as the oxide ($SnO_2$), will vary in such titaniferous ores, depending on the source, from about 0.001 to about 0.06 percent. The amount of tin (as Sn) present in purified $TiCl_4$ is typically less than 0.010 percent. The above-recited amounts of tin and silcon in purified $TiCl_4$ can be tolerated in the $TiO_2$ reactor without adversely affecting the pigmentary properties of the $TiO_2$ product.

Since both silicon and tin chlorides have boiling points relatively close to that of titanium tetrachloride as compared to the boiling point (liquefaction point) of chlorine, these materials are not separated from titanium tetrachloride during its recovery from chlorine (by liquefaction) as a by-product. Due to recycling of by-product titanium tetrachloride back to the $TiO_2$ oxidation reactor, the by-product titanium tetrachloride recovery zone serves as a concentrating zone wherein the chlorides of silicon and/or tin can accumulate to significant proportions. Obviously, when this material is recycled for use in the oxidation reactor, it will produce a titanium dioxide product which differs from that normally produced.

A process for treating by-product titanium tetrachloride containing metal chloride impurities, such as the chlorides of silicon and/or tin, has now been developed, which comprises degassing the by-product titanium tetrachloride to remove chlorine dissolved therein and thereafter distilling the degassed titanium tetrachloride in a distillation column which separates the metal halide components into the chlorides of silicon and/or tin as overhead product and titanium tetrachloride substantially free of silicon and tin as a bottoms product.

BRIEF DESCRIPTION OF THE DRAWINGS

The present invention will be more fully understood by reference to the accompanying drawings wherein:

FIG. 1 is an abbreviated schematic of an integrated titanium tetrachloride-titanium dioxide process;

FIG. 2 is an abbreviated schematic of one embodiment of the present invention wherein by-product titanium tetrachloride is degassed with air and subsequently distilled.

DETAILED DESCRIPTION

Figure 3:
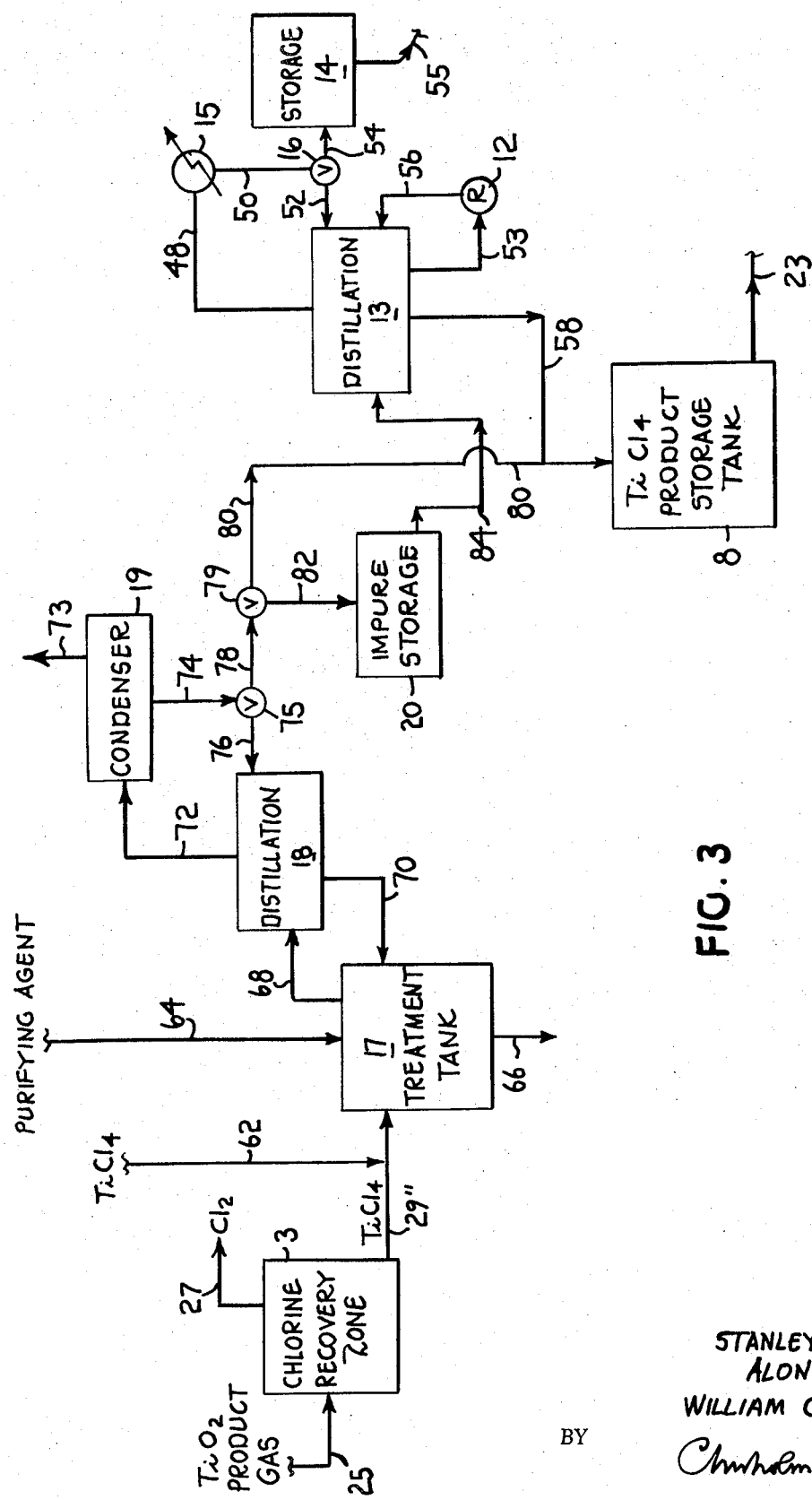
FIG. 3 is an abbreviated schematic of a further embodiment of the present invention wherein by-product titanium tetrachloride is degassed by mixing it with a heated pool of crude liquid titanium tetrachloride and chemical purifying agent and subsequently distilling the degassed product.

Referring now to FIGS. 1, 2 and 3, wherein like numerals indicate like parts, and especially FIG. 1, there is shown an abbreviated schematic of a typical integrated titanium tetrachloride-titanium dioxide process. Specifically, titanium tetrachloride is produced by charging a titaniferous ore, such as rutile, together with finely-divided carbonaceous reductant, such as coke, into chlorinator 9 as indicated by line 37. The amount of carbonaceous reductant admixed with the titaniferous ore will vary; however, typically, the amount ranges from about 10 to about 50 percent by weight, usually from 10 to about 30 percent by weight, of the total composition of the feed to the chlorinator. Chlorine is introduced into chlorinator 9 as shown by line 39 and reacted with the titanium ore-coke mixture at temperatures of from 500° C. to 1,400° C., more typically from 700° C. to 1,100° C. Product vapors including titanium tetrachloride and other metal and non-metal chlorides volatile at the chlorination temperatures are removed from chlorinator 9, as shown by line 40, condensed and the resulting condensate forwarded to impure titanium tetrachloride condensate storage 5. The impure titanium tetrachloride condensate is forwarded to purification zone 7 as shown by line 33 which can include:

(a) separtion of solid metal and non-metal chlorides, such as iron chlorides, and other solid materials, such as coke and rutile, from the liquid portion of the condensate by, for example, settling, vaporization or other conventional techniques;

(b) treatment with chemical purifying agents, such as $H_2S$, talpa oil, tall oil or soap, for the removal of vanadium from the liquid crude titanium tetrachloride resulting from step (a), and (c) one or more distillations to obtain a substantially vanadium-free, usually water-white titanium tetrachloride product. This product is forwarded to storage tank 8, as shown by line 35, from whence it is forwarded to the $TiO_2$ oxidation reactor 1, as shown by line 23.

The production of pigmentary $TiO_2$ by vapor phase oxidation of $TiCl_4$ is conducted in accordance with techniques well known in the art as, for example, in accordance with the process described in U. S. Pat. No. 3,214,284, which is incorporated herein by reference. The aforesaid reaction is well known to those skilled in the art and the specific details thereof do not represent an essential part of the present invention. In the aforesaid patent, a central stream of oxygen is surrounded, in turn, first by a shroud gas stream of inert gas, such as chlorine, and then by $TiCl_4$. The reactants are, in this manner, introduced into a reactor larger in diameter than the total diameters of the reactant inlets, mixed therein, and reacted at the above-recited temperatures.

Oxygenating gas, such as oxygen, is introduced into reactor 1 simultaneously with the introduction of titanium tetrachloride, as shown by lines 21 and 23. There, the reactants are mixed at temperatures of from about 800° C. to 1,200° C. to produce a finely-divided $TiO_2$ product. The finely-divided titanium dioxide produced is removed from reactor 1 suspended in product gases, which are principally chlorine, as shown by line 24.

The finely-divided pigmentary titanium dioxide product is removed from the suspending product gases in solids removal zone 2, as shown by line 26. The resulting gas stream, now substantially free of $TiO_2$ solids, is forwarded to chlorine recovery zone 3 as indicated by line 25. There, the gases are liquified and chlorine separated from unreacted titanium tetrachloride. The chlorine recovered, as shown by line 27, can be recycled to chlorinator 9 in order to chlorinate further titaniferous ore to titanium tetrachloride. In the alternative, the chlorine can be purified further to eliminate additional gases, such as oxygen, for use in other processes. Liquid titanium tetrachloride removed from chlorine recovery zone 3, as shown by line 20, can be returned to titanium tetrachloride storage as shown by lines 29 and 35. This procedure would lead to the difficulties discussed hereinabove and to the development of the present process to avoid them.

Referring now to FIG. 2, wherein an embodiment of the present invention is schematically illustrated, the liquid titanium tetrachloride recovered from chlorine recovery zone 3 is introduced into tank 11, as shown by line 29'. When the amount of liquid by-product titanium tetrachloride in tank 11 has accumulated to a point where it can be processed (since the amount of by-product TiCl$_4$ is a relatively small stream), substantially anhydrous air is introduced into tank 11, as shown by line 42, below the liquid level of the titanium tetrachloride present in the tank in an amount and for a length of time sufficient to degassify it, i.e., remove gaseous chlorine contained in the liquid titanium tetrachloride. Typically, the TiCl$_4$ contains greater than 0.02 percent chlorine, and usually is saturated with chlorine. The amount of chlorine dissolved in the TiCl$_4$ (at ambient temperature and pressure) is normally about 3½ percent. If the undegassed material is distilled directly, the chlorine contained therein would corrode (chlorinate) the metal distillation column and plug the underflow lines in the column with solid metal (iron) chlorides in addition to contaminating the TiCl$_4$. Because water reacts readily with titanium tetrachloride, the dew point of the degassifying air should be at 0° F. or below, and usually is between −20° F. and −60° F., preferably less than −50° F. Removal of moisture from the air is performed by drying the air with conventional dessicants, capable of drying air to the above-recited dew points. Examples of such dessicants include: silica gel (Sovabeads), activated carbon, alumina gel, anhydrous calcium sulfate (Drierite), barium oxide and calcium oxide.

As shown in FIG. 2, the dried air introduced into tank 11 is sparged therein below the surface of the liquid level. The sparging technique provides both intimate contact between the air and the liquid titanium tetrachloride, and agitation within the tank to accomplish the aforesaid intimate contact. Although only one sparging tube is shown in FIG. 2, more than one can be used. The exact number will depend on the volume of liquid titanium tetrachloride processed and the size of the tank. Further, any conventional stripping technique which gives good gas-liquid contact, e.g., a stripping tower with countercurrent flow of gas-liquid streams, can be used to degas the by-product TiCl$_4$. Degassifying air and chlorine from tank 11 are removed therefrom, as shown by line 44. This volume of gas is neutralized and disposed of as a waste gas stream. Tank 11 is typically maintained under a vacuum of from about 15 – 20 inches of water as a safety precaution.

The amount of dry air used to degassify the titanium tetrachloride in tank 11 will depend to a great extent on the quantity and temperatue of the liquid titanium tetrachloride to be degassed, the volume that this quantity occupies, the ratio of the height to the width of that volume, and the amount of chlorine present in the by-product titanium tetrachloride. Generally, the degassing time increases progressively with increases in the volume to be degassed. Typically, it has been found that about 1 pound of sparged, substantially dry air, e.g., −50° F. dew point, will degas 14 pounds of titanium tetrachloride containing about 3½ percent dissolved chlorine at 25° C. when the ratio of the height to the width occupied by the TiCl$_4$ volume is about 3:1. In other terms, it has been found that one ton of by-product TiCl$_4$ can be degassed in from 2 to 10 hours with a sparging rate of about 7 feet$^3$/minute, i.e., a total of from about 800 to about 4,500 feet $^3$/ton of by-product TiCl$_4$. Degassing should be continued until the chlorine content of the TiCl$_4$ is 0.02 percent or less, preferably less than about 0.01 percent, i.e., 100 ppm or less. Such levels of dissolved chlorine can be tolerated in steel equipment.

Following degassification, the liquid titanium tetrachloride is forwarded to distillation column 13, as shown by line 46. Distillation column 13 can be of any suitable type, i.e., packed or plate (bubble-cap or sieve), to provide the rectification capacity necessary for separating titanium tetrachloride from near boiling metal chlorides, such as stannic chloride, as well as lower boiling metal chlorides, such as silicon tetrachloride.

Distillation column 13 is provided with the conventional overhead condenser 15 and reboiler 12. As shown, the overhead vapors are removed from column 13, as shown by line 48, condensed in condenser 15, removed from the condenser, as shown by line 50, and either returned to the column as reflux, as shown by line 52, or forwarded to storage tank 14, as shown by line 54. The division between reflux (R) and product (P) is regulated by valve 16 from total reflux to total product or any ratio therebetween. A portion of the bottoms from distillation column 13 is removed, as shown by line 53, heated by reboiler 12 and returned to the column as shown by line 56. A bottoms cut from the distillation column is removed therefrom, as shown by line 58, and forwarded to storage tank 8.

The titanium tetrachloride stored in tank 8 is substantially free of other metal chloride impurities, e.g., silicon tetrachloride, vanadium tetrachloride, iron chlorides and stannic chloride, and can be forwarded for use in the titanium dioxide oxidation reactor. By substantially free is intended to mean a concentration of metal chloride impurities that can be tolerated in the oxidation reactor. Tolerable concentrations of metal halides are typically as follows: less than 700 ppm SiCl$_4$ (115 ppm as Si), less than 600 ppm SnCl$_4$ (275 ppm as Sn), less than 100 ppm vanadium, as Vn, and less than 10 ppm iron, as Fe. However, if silicon is used in the production of pyrogenic TiO$_2$, the amount of silicon that can be tolerated is limited only by the amount used in the production of titanium dioxide. The metal chlorides collected in tank 14 are removed therefrom, as shown by line 55, and, if desired, are subjected to further distillations to separate silicon tetrachloride, if present, from stannic chloride. Since tank 14 also contains TiCl$_4$, any TiCl$_4$ recovered from the last-mentioned distillations can be recycled to tank 11 for reprocessing as described above. This procedure concentrates the silicon and/or tin chlorides and reduces the amount of TiCl$_4$ eventually removed with such other metal chlorides by line 55.

In an alternative embodiment of the present process, in lieu of degassing with substantially dry air, as shown in FIG. 2, the by-product titanium tetrachloride is degassed by returning this material to a pool of titanium tetrachloride containing a chemical purifying agent that has an affinity for chlorine. As shown in FIG. 3, by-product titanium tetrachloride obtained from chlorine recovery zone 3 is forwarded to treatment tank 17 as shown by line 29'' wherein a pool of liquid titanium tetrachloride containing the aforesaid purifying agent is present. The aforesaid pool can be obtained from the chemical treatment zone from $TiCl_4$ purification 7 (FIG. 1) or preferably can be the chemical treatment tank used to purify crude titanium tetrachloride of vanadium. Regardless of the source, $TiCl_4$ (optionally containing purifying agent) is introduced into the treatment tank, as shown by line 62. If purifying agent is not premixed with said $TiCl_4$, it can be introduced into tank 17, separately, as shown by line 64. In the alternative, by-product titanium tetrachloride can be accumulated in treatment tank 17 until a sufficient quantity is present to allow economic treatment thereof.

As noted above, treatment tank 17 can be the treatment tank utilized in the production of titanium tetrachloride for chemical removal of vanadium impurities. Thus, by-product titanium tetrachloride produced during the production of pyrogenic titanium dioxide is recycled to a treatment tank used for removing vanadium from crude $TiCl_4$ in the production of titanium tetrachloride. In that event, the tank will already contain a pool of $TiCl_4$ and purifying agent therefor and the chemical reaction products therefrom (high boiling chemical complexes) remaining from the treatment of crude $TiCl_4$ since this tank normally is not drained completely. The residual pool in tank 17 usually comprises from 20 to 50 percent of the tank's capacity. Treatment tank 17 is typically heated by conventional techniques, such as the combination of a reboiler and forced circulation high volume pump, so that treatment tank 17 is maintained at a temperature of between about 270° F. and about 300° F. These temperatures cause vaporization of titanium tetrachloride from the liquid surface in the tank. The contents of treatment tank 17, including sludge deposits (reaction products) which form, can be purged from treatment tank 17 as shown by line 66.

Vaporous titanium tetrachloride withdrawn from treatment tank 17 is removed therefrom, as shown by line 68, and forwarded to distillation column 18. Column 18 can be of any suitable type, packed or plate (bubble cap or sieve), having sufficient rectification capacity to permit production of water-white titanium tetrachloride substantially free of vanadium. Bottoms from column 18 are returned to treatment tank 17, as shown by line 70. The overhead vapors from treatment still 18 are forwarded to condenser 19, as shown by line 72, and the condensate therefrom removed as shown by line 74. Valve 75 can be regulated to provide total reflux through line 76 or total product through line 78 or any reflux/product ratio therebetween. Vapors from condenser 19 are removed therefrom, as shown by line 73, to a vent condenser and subsequent waste gas treatment (not shown).

Degassing of by-product $TiCl_4$ introduced into tank 17 by line 29'' is accomplished by placing valve 75 on total reflux and heating the contents of tank 17 to from about 270° F. to 300° F., e.g., 290° F. Preferably, the contents of tank 17 are already at the aforesaid temperatures before the introduction of by-product $TiCl_4$ therein. At these temperatures, $TiCl_4$ is vaporized, distilled in column 18 and condensed in condenser 19 and returned to column 18. Simultaneouly, a portion of the dissolved chlorine in the by-product $TiCl_4$ is driven off (flashed) and is removed from the system by line 73 to the vent condenser and waste gas treatment. The remaining portion of the dissolved chlorine is tied up by the purifying agent — presumably by a chemical reaction therebetween. This procedure is continued until a sample of condensate from column 18 analyzes less than 0.02 percent chlorine, preferably less than 0.01 percent chlorine. Corrosion of column 18 by the vaporized chlorine has not been observed to occur.

Purifying agent that is introduced into treatment tank 17 from a source not shown by line 64 also ties up any uncomplexed vanadium in either the residuum in treatment tank 17 or in the by-product $TiCl_4$. Preferably, the purifying agent is present in the tank before the by-product $TiCl_4$ is introduced therein so as to immediately tie up the dissolved chlorine. The purifying agents useful in the present process are those well known to those skilled in the art. These agents have an affinity for chlorine and preferably also have an affinity for vanadium and are used in amounts sufficient to consume free chlorine dissolved in the by-product $TiCl_4$, i.e., any chlorine which is not otherwise removed by, for example, stripping, evaporation or flashing. Among the purifying agents disclosed in the art that can be used in the present embodiment, there can be mentioned the organic purifying agents, which include animal oil, e.g., talpa oil, and vegetable oils, e.g., tall oil, and waxes and hydrolyzed and saponified derivatives, such as fatty acids, fatty alcohols and soaps, petroleum fractions, such as lubricating oil, mineral oil, and heavy residual fractions, such as Bunker C oil. Soaps, particularly the alkali metal salts of high molecular weight fatty acids, such as those of stearic, myristic, palmitic, oleic, and lauric acids or mixtures obtained by reacting an alkali metal hydroxide with an animal or vegetable fat are also useful. Typically, from about 0.03 to about 10 percent by weight of the purifying agent is used, based on the amount of titanium tetrachloride to be treated.

The initial vapors of substantially chlorine-free titanium tetrachloride coming off as overhead from column 18 and condensed in condenser 19 contain, depending on their presence in the treatment tank, the near and lower-boiling metal chlorides, i.e., the chlorides of silicon and tin. This condensate is forwarded via line 74, valve 75, line 78, valve 79, and line 82 to impure $TiCl_4$ storage tank 20. Once the aforementioned (as well as any others that might be present) contaminating chlorides of tin and silicon are depleted from treatment tank 17, the titanium tetrachloride removed from column 18 as overhead is substantially silicon, tin, iron and vanadium-free and is suitable for use in the production of titanium dioxide. Typically, this $TiCl_4$ will have less than about 115 ppm silicon (as Si), less than 275 ppm tin (as Sn), less than 10 ppm vanadium (as Vn) and less than 10 ppm iron (as Fe). At this point, valve 79 is manipulated and the product condensate from condenser 19 permitted to flow to titanium tetrachloride product storage tank 8 as indicated by line 78, valve 79 and line 80. The liquid titanium tetrachloride containing the tin and silicon chlorides is removed from storage tank 20 and forwarded to distillation column 13, as shown by line 84. Rectification of the titanium tetrachloride feed in column 13 is the same as that described heretofore with respect to FIG. 2.

The operation of the present invention will best be understood by the following examples which, it will be understood, are not intended to unduly limit the scope of the invention, since a skilled chemical engineer will readily appreciate the numerous modifications which can be introduced without deviating from the invention.

EXAMPLE I

The following example utilizes the embodiment of the present invention illustrated in FIG. 3. About 42 tons of ambient temperature, by-product titanium tetrachloride that is produced during the production of pyrogenic titanium dioxide in accordance with the process described in U. S. Pat. No. 3,214,282 and that contains about 2.33 percent tin chloride ($SnCl_4$), about 0.48 percent $SiCl_4$ and is saturated with chlorine, is charged to treatment tank 17. The treatment tank contains about 32 tons of crude titanium tetrachloride that was previously treated with talpa oil. This material is at a temperature of about 290° F. and contains about 5 weight percent solids. Additional talpa oil (about 0.1 weight percent based on the by-product $TiCl_4$) is added to the treatment tank to insure a substantially chlorine and vanadium free $TiCl_4$ product and the mixture heated to retain a pot temperature of 290° F. Column 18 is placed on total reflux and the contents of tank 17 is refluxed for a total of about 25 hours under total reflux conditions. The condensate temperature from condenser 19 is about 175° F. and, when analyzed, is found to contain about 0.8 percent $SiCl_4$, 21.6 percent $SnCl_4$, 77.6 percent $TiCl_4$ and to be substantially chlorine free. The condensate from condenser 19 is then forwarded to impure storage tank 20 until the condensate analyzes less than 600 ppm of $SnCl_4$. At that point, the condensate is forwarded to product storage tank 8. Simultaneously with the forwarding of condensate to tank 8, additional crude titanium tetrachloride is introduced into the treatment tank to maintain the liquid level therein. A total of about 39 tons of impure $TiCl_4$ is placed in tank 20 and about 38 tons are eventually placed in tank 8.

The contents of impure storage tank 20 are analyzed and found to contain about 97.2 percent $TiCl_4$, 2.3 percent $SnCl_4$ and about 0.5 percent $SiCl_4$. This material is charged to a distillation column 13. Reboiler 12 is used to heat the column to about 283° F. Column 13 is placed on total reflux until the temperature of the overhead vapors start to fall below about 260° F. At that point, an overhead product is taken to storage tank 14. This product is analyzed and found to contain about 44 percent $SnCl_4$, 8 percent $SiCl_4$ and 48 percent $TiCl_4$. Simultaneously, a bottoms product is taken to storage tank 8. This product is substantially pure $TiCl_4$, i.e., about 99.94 percent $TiCl_4$. The bottoms product stream is monitored continuously with a gas chromatograph to insure the continued purity of this product. About 36 tons of liquid feed are charged to column 13 with about 29 tons being recovered as purified $TiCl_4$ and about 7 tons being recovered as a mixture of tin, silicon and titanium chlorides. No corrosion of column 13 is observed.

EXAMPLE II

By-product titanium tetrachloride having a composition similar to that described in Example I is charged to a storage tank until a quantity of about 20 tons is accumulated. This material is also produced during production of pyrogenic $TiO_2$ as described in Example I. The storage tank is equipped with air spargers capable of introducing about 7 $feet^3$ of dry air per minute. Dry air (dew point of about −50° F.) is introduced continuously into the tank below the liquid level in the tank at the above rate for about 5 days. At the end of this time, the by-product titanium tetrachloride is found to contain less than 0.02 weight percent chlorine and sparging is discontinued. The degassed by-product $TiCl_4$ is charged to the distillation column 13 used in Example I and fractionally distilled in the same manner. About 16½ tons of purified $TiCl_4$, as a bottoms product, is recovered and about 3½ tons of a mixture of tin, silicon and titanium chlorides is recovered as an overhead product. Again, no corrosion of column 13 is observed.

EXAMPLE III

By-product titanium tetrachloride having the same composition as the by-product material in Example II is charged directly to distillation column 13 without degassing. A distillation is conducted in the same manner as that described in Example I. Within 24 hours, the still bottom product line plugged with solids. After blowing out these lines, the distillation is continued. However, plugging again develops soon thereafter and the column is shut down prematurely. Analysis of the solids plugging the product line reveals that the solids are iron chlorides, which indicates severe corrosion of the column by chlorine.

Examples I – III show that tin chloride ($SnCl_4$) present in by-product titanium tetrachloride can be removed therefrom by fractional distillation, but that before distillation can be performed, the by-product titanium tetrachloride must be degassed to avoid severe corrosion of distillation equipment from the chlorine dissolved therein.

While the present invention has been described in detail with respect to certain embodiments thereof, it is not intended that these details impose undue limitations upon the breadth of the invention, since numerous modifications are within the scope and spirit of the appended claims.

We claim:

1. In the process of producing titanium dioxide by vapor phase oxidation of titanium tetrachloride in a reactor wherein unreacted titanium tetrachloride is recovered as a by-product of the oxidation process and recycled to the oxidation reactor, the improvement which comprises, in combination, the steps of degassing said by-product liquid titanium tetrachloride to remove dissolved free chlorine therefrom, distilling said degassed liquid titanium tetrachloride in a distillation column to separate lower boiling metal chloride impurities therefrom, and removing from the distillation column substantially pure titanium tetrachloride.

2. A process for treating by-product liquid titanium tetrachloride which contains dissolved free chlorine and tin chloride impurity and which is obtained from the production of titanium dioxide by vapor phase oxidation of titanium tetrachloride in a reactor, which comprises, in combination, the steps of degassing the by-product liquid titanium tetrachloride to remove dissolved free chlorine therefrom, distilling the degassed liquid titanium tetrachloride in a distillation column to separate tin chloride impurity therefrom, removing substantially pure titanium tetrachloride from the distillation column and forwarding such titanium tetrachloride to the oxidation reactor.

3. The process of claim 2 wherein the degassed liquid titanium tetrachloride contains less than 0.02 weight percent free chlorine.

4. A process for treating by-product liquid titanium tetrachloride obtained from the production of titanium dioxide by vapor phase oxidation of titanium tetrachloride, said by-product titanium tetrachloride containing dissolved free chlorine and metal chloride impurities selected from the group consisting of silicon tetrachloride, stannic chloride and mixtures thereof, which comprises, in combination, the steps of degassing said by-product liquid titanium tetrachloride by contacting the liquid titanium tetrachloride with dry air to remove dissolved chlorine therefrom, distilling degassed liquid titanium tetrachloride containing less than 0.02 weight percent dissolved chlorine in a distillation column to separate said metal chloride impurities therefrom and removing substantially pure titanium tetrachloride from said column.

5. The process of claim 1 wherein said by-product titanium tetrachloride is degassed by stripping with dried air.

6. The process of claim 1 wherein said by-product titanium tetrachloride is degassed by mixing therewith a liquid mixture of titanium tetrachloride and purifying agent having an affinity for chlorine in quantities sufficient to consume chlorine dissolved in said by-product titanium tetrachloride.

7. The process of claim 6 wherein said purifying agent is an organic purifying agent.

8. The process of claim 7 wherein said organic purifying agent is talpa oil.

9. The process of claim 6 wherein from about 0.03 to about 10 weight percent of purifying agent, based on by-product titanium tetrachloride is used.

10. The process of claim 1 wherein the metal chloride impurities are selected from the group consisting of the chlorides of silicon, tin and mixtures thereof.

11. The process of claim 1 wherein said degassed material contains less than 0.02 weight percent dissolved free chlorine.

* * * * *

UNITED STATES PATENT OFFICE
CERTIFICATE OF CORRECTION

Patent No. 3,760,071    Dated September 18, 1973

Inventor(s) STANLEY F. BROZOZOWSKI, ET AL

It is certified that error appears in the above-identified patent and that said Letters Patent are hereby corrected as shown below:

On the title page:
[21] Appl. No. "195,033"    should read

---Appl. No. 105,033---.

Signed and sealed this 25th day of December 1973.

(SEAL)
Attest:

EDWARD M. FLETCHER, JR.　　　　　　　RENE D. TEGTMEYER
Attesting Officer　　　　　　　　　　Acting Commissioner of Patents